US009426835B2

(12) United States Patent
Van De Laar et al.

(10) Patent No.: US 9,426,835 B2
(45) Date of Patent: Aug. 23, 2016

(54) COMMUNICATION BETWEEN A CLIENT DEVICE AND A WIRELESS PERIPHERAL UNIT

(75) Inventors: Franciscus Antonius Maria Van De Laar, Veldhoven (NL); Johannes Arnoldus Cornelis Bernsen, Eindhoven (NL); Koen Johanna Guillaume Holtman, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 101 days.

(21) Appl. No.: 14/004,509

(22) PCT Filed: Mar. 15, 2012

(86) PCT No.: PCT/IB2012/051234
§ 371 (c)(1),
(2), (4) Date: Sep. 11, 2013

(87) PCT Pub. No.: WO2012/127372
PCT Pub. Date: Sep. 27, 2012

(65) Prior Publication Data
US 2014/0003409 A1    Jan. 2, 2014

(30) Foreign Application Priority Data
Mar. 18, 2011    (EP) ..................................... 11305307

(51) Int. Cl.
*H04W 76/02*    (2009.01)
*H04W 4/00*    (2009.01)
(Continued)

(52) U.S. Cl.
CPC .............. *H04W 76/02* (2013.01); *H04L 69/08* (2013.01); *H04W 4/008* (2013.01); *H04W 84/18* (2013.01); *H04W 88/06* (2013.01); *H04W 92/02* (2013.01)

(58) Field of Classification Search
CPC ............. H04B 7/14; H04Q 7/24; H04J 3/00; H04W 76/12; H04W 4/008
See application file for complete search history.

(56) References Cited

U.S. PATENT DOCUMENTS

2003/0156567 A1* 8/2003 Oak .............................. 370/338
2004/0266439 A1   12/2004 Lynch, Jr.
(Continued)

FOREIGN PATENT DOCUMENTS

EP        1496668 A1    1/2005
WO    WO03105418 A2   12/2003

OTHER PUBLICATIONS

George, Moses L. et al., "Bluetooth Handover Control for Roaming System Applications", ACSEL and OCLNB Labs, School of Electrical and Computer Engineering Oklahoma State University, Stillwater, Oklahoma, 2002 IEEE.
(Continued)

Primary Examiner — Anez Ebrahim
(74) Attorney, Agent, or Firm — Larry Liberchuk

(57) ABSTRACT

A communication between a client device (2) and a peripheral unit (14) uses tunneling over another communication mode. The other communication mode is implemented between the client device and a host device (1), in addition to a communication mode implemented between the host device and the peripheral unit. The host device and the client device are each provided with additional communication modules (3-6), at application level and transport level. Security issues against intrusions into the communication may be implemented by the modules added to the host or client unit.

18 Claims, 1 Drawing Sheet

(51) Int. Cl.
*H04L 29/06* (2006.01)
*H04W 84/18* (2009.01)
*H04W 88/06* (2009.01)
*H04W 92/02* (2009.01)

(56) References Cited

U.S. PATENT DOCUMENTS

2006/0268329 A1* 11/2006 Lo .............................. 358/1.15

| | | |
|---|---|---|
| 2008/0125039 A1 | 5/2008 | Glinka |
| 2009/0034498 A1 | 2/2009 | Banerjea |
| 2009/0257379 A1 | 10/2009 | Robinson |

OTHER PUBLICATIONS

Specification of the Bluetooth System, Wireless Connections Made Easy, "Master Table of Contents & Compliance Requirements", Jul. 26, 2007.

* cited by examiner

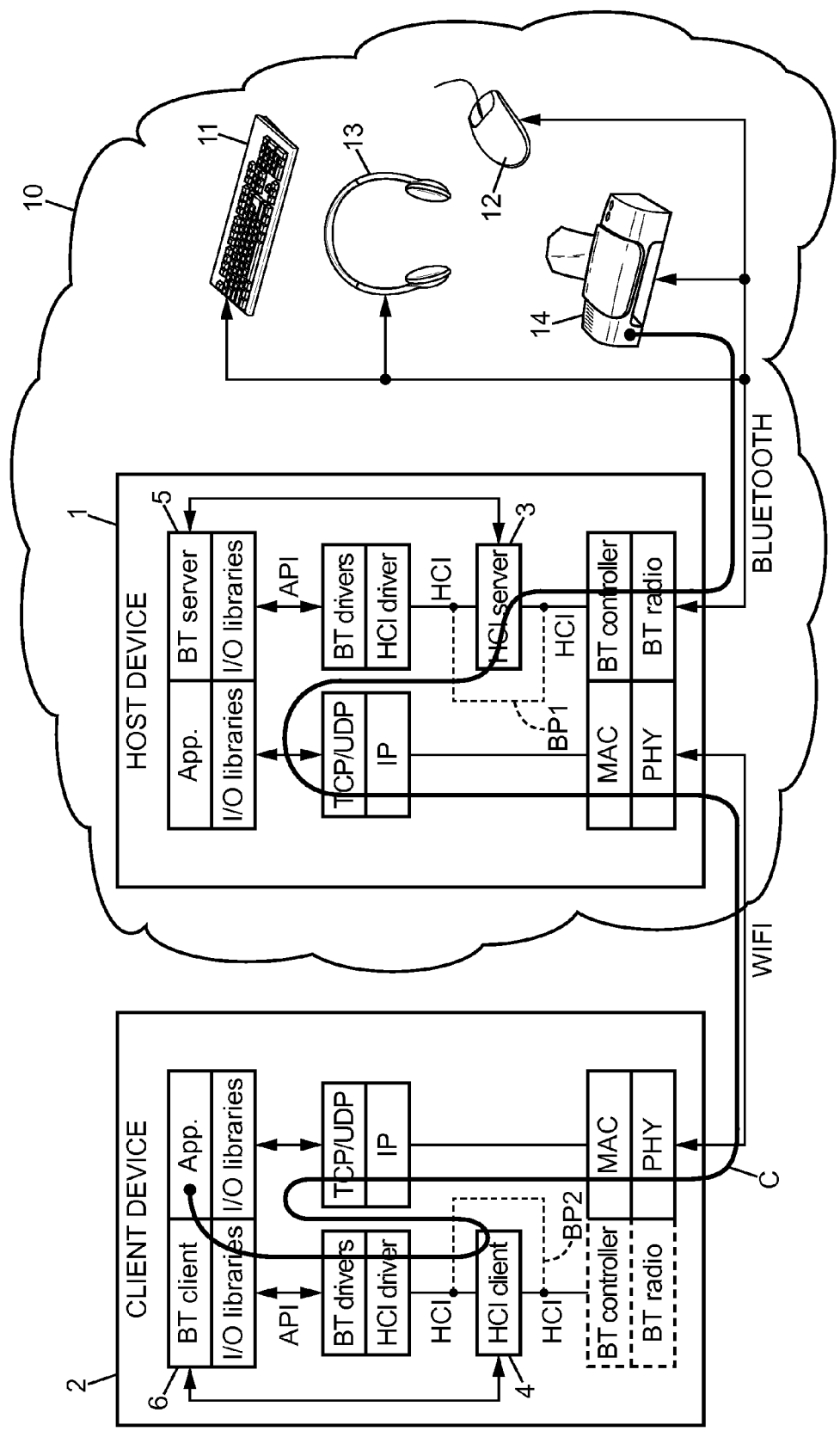

COMMUNICATION BETWEEN A CLIENT DEVICE AND A WIRELESS PERIPHERAL UNIT

The present invention relates to communication between a client device and a wireless peripheral unit. This invention is, for example, relevant for Bluetooth communication with the peripheral unit.

The Bluetooth standard specifies a protocol for wireless short range communication between devices, which is well-known. It is typically used for connecting wireless peripheral units such as a keyboard, a mouse, a headset, a printer, etc. . . . to one or several devices, thereby forming a set of peripheral units in a local area network which is called piconet in the Bluetooth standard.

But one device which is Bluetooth-connected to a peripheral unit may also pertain to another network, so that it may be useful to have the peripheral unit controlled not only by the Bluetooth-connected device but also with an extra device of the another network. Put another way, it may be useful to share the Bluetooth peripheral unit between the Bluetooth-connected device and the extra device, although the extra device does not pertain to the Bluetooth piconet of the peripheral unit. In the description below, the Bluetooth-connected device and the extra device are called respectively host device and client device.

There already exist handover mechanisms for extending the Bluetooth connection to the client device, so that an operation of the peripheral unit can be controlled from the client device. But when the Bluetooth piconet contains several peripheral units, pairings of the client device respectively with the peripheral units are required, so that the sharing of the peripheral units is not easy to accomplish. In addition, each time a new Bluetooth peripheral unit is added into the piconet, an additional pairing of this new peripheral unit with the client device is required. Therefore, the sharing process is complex, and security matters arise with respect to uncontrolled access to the Bluetooth-connected hardware and the Bluetooth-transmitted data.

An object of the present invention is to provide simple access to peripheral units, for a client device which is not connected with these peripheral units.

An additional object of the invention is to provide such access so that it is secure with respect to intrusive attempts directed to the set of peripheral units.

To this purpose, the present invention proposes using a tunneling process for handing over the already connected peripheral units to the client device, through the host device. Then, it is sufficient that the host device is paired with several peripheral units, for the client device to appear automatically paired with each one of these peripheral units. Such pairing translation, from the host device to the client device, is achieved without user intervention, in a single step for all the initially connected peripheral units, so that it is simple.

In addition, the security of the tunneling process depends on the security of the communication between the client device and the host device, which is used for implementing tunneling.

Furthermore, the invention may be implemented completely in software, i.e. by programming appropriately currently available host device and client device. Thus, no additional hardware is required, so that implementation of the invention is easy and may be inexpensive.

More precisely, the present invention proposes a process for enabling communication between a client device and a peripheral unit, the peripheral unit being arranged for communicating with a host device using packets of a first type transmitted between the peripheral unit and the host device according to a first communication mode, this first communication mode being wireless, the host device being further arranged for communicating with the client device using packets of a second type transmitted between the host device and the client device according to a second communication mode, which process comprises:

/i/ providing the host device with a server transport module suitable for directing a content of first packets of the first type received from the peripheral unit, to a process chain internal to the host device in view of arranging this content into first packets of the second type, and then transmitting these first packets of the second type to the client device, the server transport module being further suitable for recovering a content of second packets of the first type intended to the peripheral unit and contained in second packets of the second type received from the client device, and then directing these second packets of the first type for transmission by the host device to the peripheral unit; and /ii/ providing the client device with a client transport module suitable for directing the content of the second packets of the first type intended to the peripheral unit, to a process chain internal to the client device in view of arranging this content into second packets of the second type, and then transmitting these second packets of the second type by the client device to the host device, the client transport module being further suitable for recovering the content of first packets of the first type contained in first packets of the second type received from the host device.

Thus, the server transport module and the client transport module form together a communication interface at transport level between the client device and the host device, for communication between the client device and the peripheral unit.

In the process of the invention:

/iii/ the host device is further provided with a server application module at application level, this server application module being suitable for controlling an operation of the server transport module at the transport level within the host device; and /iv/ the client device is further provided with a client application module at application level, this client application module being suitable for managing the peripheral unit, and for producing instructions based on application instructions output by an application run by the client device, and the second packets of the first type being based on the instructions, and the client application module being also suitable for controlling an operation of the client transport module at transport level within the client device.

In a particular implementation of the invention, the server application module may also be suitable for exposing the peripheral unit to the client device.

The present invention also proposes:
- a host device adapted for implementing the process of the invention;
- a client device adapted for implementing the process of the invention;
- a communication system comprising such host device, client device, and a peripheral unit, adapted for implementing all together the process of the invention;

a computer program product intended for the host device, comprising codes of a server transport module and of a server application module suitable for executing steps of the process of the invention to be performed by the host device; and another computer program product intended for the client device, comprising codes of a client transport module and a client application module suitable for executing steps of the process of the invention to be performed by the host device.

In preferred implementations of the invention, the following additional features may be used, separately of in combination with one another:

the packets of the first type may be Bluetooth packets, so that the first communication mode of wireless type, which is used between the host device and the peripheral unit, is Bluetooth communication mode;

the server transport module and the client transport module may be at Host Controller Interface (HCI) level within a Bluetooth protocol stack;

the packets of the second type may be Internet Protocol (IP) packets;

the host device and the client device may be adapted to transmit the Internet Protocol packets by Wi-Fi transmission;

a User Datagram Protocol (UDP) layer may be implemented with Internet Protocol (IP) for communication between the host device and the client device, and wherein the packets of the first type are transmitted using synchronous connections between said host device (1) and the peripheral unit (14);

a Transmission Control Protocol (TCP) layer may be implemented with Internet Protocol (IP) for communication between the host device and the client device, and wherein the packets of the first type are transmitted using asynchronous connections between said host device and the peripheral unit;—the host device may be adapted for updating a security link key of the connection between the client device and the peripheral unit;

the host device may be adapted for updating an encryption key of the connection between the client device and the peripheral unit;

the host device may be further adapted to perform security functions for avoiding intrusive attempts that would be directed to the peripheral unit and the transmitted data. In particular, these security functions may be performed by the server application module within the host device. Alternatively, they may also be performed by any other module added to the host device or the client device according to the invention.

Other features and advantages of the invention will appear from the following detailed specification, in connection with the appended FIGURE.

FIG. 1 is a block diagram of a communication system adapted for implementing a process according to the invention.

The invention is now described in the particular case of Bluetooth communication used for the wireless communication mode between the host device and at least one peripheral unit.

FIG. 1 represents a Bluetooth piconet 10, a host device 1 and a client device 2, adapted for implementing the invention.

The host device 1 pertains to the Bluetooth piconet 10, which further comprises Bluetooth-connected peripheral units such as a keyboard 11, a mouse 12, a headset 13, a printer 14, etc. . . . . The host device 1 may be a computer unit for example, and the piconet 10 may comprise additional devices and peripheral units. All the peripheral units and devices pertaining to the piconet 10 are designed for Bluetooth communication with each other as commonly known.

The client device 2 may be a mobile phone or a tablet which is connected to the host device 1 using a communication channel separate from that operating within the Bluetooth piconet 10. This connection between the devices 1 and 2 may be wired or wireless. For example, the devices 1 and 2 may be connected to each other in a peer-to-peer (P2P) mode.

For illustration purpose, we describe now an implementation of the invention which aims at controlling the printer 14 with the client device 2. We will also suppose that the communication mode between the host device 1 and the client device 2 is IP over Wi-Fi connection, for example a Wi-Fi peer-to-peer (P2P) connection, also known as Wi-Fi DIRECT.

Because the host device 1 pertains to the Bluetooth piconet 10, it is provided with communication modules arranged according to the Bluetooth protocol stack. This stack comprises in particular from the application level to the base level: an application layer, input/output (I/O) libraries, Bluetooth (BT) drivers, a Host Controller Interface (HCI) driver, a Bluetooth (BT) controller, and a Bluetooth (BT) radio layer. Further intermediate communication layers may also be used. In a known manner, the interface between the I/O libraries and the Bluetooth drivers is the Application Programming Interface (API), and the interface between the HCI driver and the Bluetooth controller is the standardized Host Controller Interface.

For communicating with the client device 2, the host device 1 is also provided with communication modules arranged for IP communication. Again in a known manner, these modules comprise in particular from the application level to the base level: the application layer, input/output (I/O) libraries, a Transmission Control Protocol (TCP) or User Datagram Protocol (UDP) layer, an Internet Protocol (IP) layer, a Medium Access Control (MAC) layer and a physical (PHY) layer.

Thus, the host device 1 is initially designed for both IP and Bluetooth communication modes.

The client device 2 is also designed for IP communication in a similar way, and further at least partially designed for Bluetooth communication too.

Starting from this configuration, the devices 1 and 2 are completed in the following manner for implementing the present invention:

a server transport module 3 is added in the Bluetooth stack of the host device 1, at one transport level ranging from the API interface inclusive down to the HCI interface inclusive;

a client transport module 4 is added in the Bluetooth stack of the client device 2 at the same transport level as that of the server transport module 3;

at the application level, a Bluetooth server module 5 is added to the Bluetooth stack in the host device 1, and a Bluetooth client module 6 is added to the Bluetooth stack in the client device 2.

The Bluetooth server module 5 and the Bluetooth client module 6 correspond respectively to the server application module and the client application module introduced in the general description of the invention.

As an example, the server transport module 3 and the client transport module 4 may be added at the HCI interface in the Bluetooth stack, but they may be added alternatively anywhere else in the Bluetooth stack between the API and the HCI interfaces, including at the API interface. Therefore, the server transport module 3 is a HCI server module 3 in the implementation represented, and the client transport module 4 is a HCI client module 4.

The curved line C in FIG. 1 represents a process path for data produced by the application run in the client device 2 and transmitted to the printer 14. The HCI client module 4 transports the HCI packets over the TCP/IP or UDP/IP layers, so that the content of the HCI packets is transmitted over the Wi-Fi connection to the host device 1. Within the host device 1, this content in reception-processed through the IP/TCP or IP/UDP layers, and then transmitted to the HCI server module 3. This latter recovers the HCI packets, and then processes so that the data are Bluetooth-transmitted to the printer 14. During such communication process, the HCI packets of the Bluetooth communication mode are encapsulated within IP packets which are transmitted over the Wi-Fi connection between the devices 1 and 2. Reverse process is used for data transmitted from the printer 14 to the client device 2, corresponding to the same path C in the opposite direction. Thus the HCI server module 3 and the HCI client module 4 form with each other a new HCI transport interface in addition to the Bluetooth interfaces provided by the Bluetooth specification.

There are four different types of HCI packets as described in Vol. 2, part E, clause 5.1 of the Bluetooth 2.1+EDR standard, that need to be handled by the HCI server module 3 and the HCI client module 4:

Command packets which contain Bluetooth commands from the client device 2 to the Bluetooth controller of the host device 1, for management purposes such as controller information or configuration, device discovery, device setup, connection setup, authentication and encryption. In general, these commands will be initiated at the application level and the HCI client module 4 will forward them to the host device 1 by encapsulating one or more HCI commands in a TCP/IP packet. The HCI server module 3 will extract these commands from the TCP/IP packets and sent them to the Bluetooth controller of the host device 1;

Event packets which are sent from the Bluetooth controller of the host device 1 to the client device 2 either in response to commands or to requests originating from one of the peripheral units 11-14. The HCI server module 3 will sent one or more event packets to the client device 2 using TCP/IP. The HCI client module 4 will either handle these events locally or forward them to the Bluetooth client module 6;

ACL (Asynchronous Connectionless Link) data packets which are used to exchange application data between the client device 2 and the Bluetooth controller of the host device 1. Since in general ACL is used when data integrity is more important than latency, TCP/IP will be used to transmit ACL data from the client device 2 to the host device 1 or vice-versa. If the ACL packet size exceeds the size of the TCP (or UDP) data field, then the HCI server module 3 or HCI client module 4 may need to split it over two or more TCP/IP packets, in which case the HCI client module 4 server or HCI module 3, respectively, should reassemble the full ACL packet; and SCO (Synchronous Connection-oriented Link) data packets which are used for time critical data from the client device 2 to the host device 1 and/or vice-versa without retransmissions. Therefore these packets will typically be forwarded by the HCI server module 3 or HCI client module 4 using UDP/IP rather than TCP/IP. One or more SCO data packets may be encapsulated in one UDP/IP packet.

For still allowing normal Bluetooth operation of the host device 1 with respect to the piconet 10, the HCI server module 3 is further provided with a bypass mode BP1, which drives the HCI packets directly between the Bluetooth controller and the HCI driver within the host device 1. Similarly, the HCI client module 4 may also be provided with a bypass mode BP2, if the client device 2 is also able to operate complete Bluetooth transmission with other external devices (not shown).

Path C shows that within the host device 1, the Bluetooth drivers and the HCI driver of the Bluetooth stack are not required for the invention. It also shows that the Bluetooth controller and the Bluetooth radio facilities within the client device 2 are not required either for implementing the invention. Therefore, the invention provides access to the Bluetooth peripheral units 11-14 for the client device 2, even if this latter is devoid of Bluetooth radio facilities.

TCP/IP or UDP/IP processing within the devices 1 and 2 for implementing the invention may be selected depending on the type of the Bluetooth connection in the piconet 10. For example, Bluetooth synchronous connections between the host device 1 and one of the peripheral units 11-14 may profit from UDP protocol layer characteristics, whereas Bluetooth asynchronous connections better match characteristics of the TCP protocol layer.

The function of the Bluetooth server module 5 may comprise exposing the peripheral units 11-14 which are available in the piconet 10 to the client device 2. Bluetooth server module 5 also manages the virtual HCI connection which is provided by the invention between the devices 1 and 2. Thus, the Bluetooth pairings of the peripheral units 11-14 with the host device 1, when they are set prior to initiation of the communication between devices 1 and 2, can be handed over to the client device 2. If necessary, the Bluetooth server module 5 may also configure the peripheral units 11-14 specifically so that these units can be Bluetooth-controlled by the client device 2. Indeed, it may be useful to change Bluetooth connection related parameters for the peripheral units 11-14 to take into account network characteristics such as latency or error sensitivity. For example, timeout parameters of the peripheral units 11-14 may be adapted.

Optionally, when a further peripheral unit appears available in the piconet 10 after the devices 1 and 2 have been virtually HCI-connected to each other, the Bluetooth server module 5 may allow the client device 2 to initiate direct pairing with this further peripheral unit.

The function of the Bluetooth client module 6 comprises managing the Bluetooth peripheral units 11-14 and the HCI connection from the client device side.

Generally, the Bluetooth server module 5 initiates and terminates the Bluetooth connections between the client device 2 and any one of the peripheral units 11-14, but it is possible for the Bluetooth client module 6 to do this as well.

According to a first improvement of the invention, the Bluetooth server module 5 may adapt the Bluetooth peripheral data format currently used within the piconet 10 to a format supported by the client device 2.

According to a second improvement of the invention, one of the modules 3 to 6, preferably the Bluetooth server module 5, may have additional functions relating to communication security. In particular, it may be adapted for one or more of the following functions:

/1/ the Bluetooth server module 5 may support a restricted subset of Bluetooth commands available to the client device 2, in particular a restricted subset of HCI commands, so as to limit to this subset the commands produced by the client device 2 which are forwarded to the Bluetooth peripheral units 11-14. Then, the Bluetooth commands which do not pertain to the subset but are produced by the client device 2 are handled but not executed by the host device 1;

/2/ the Bluetooth server module 5 may disable discovery of some of the Bluetooth peripheral units by the client device 2, using the server transport module 3. Such disabling controlled directly via the Bluetooth server module 5 is easy to implement, because it is controlled at application level;

/3/ the Bluetooth server module 5 may change or update a security link key of the Bluetooth connection between the client device 2 and at least one of the peripheral units 11-14;

/4/ the Bluetooth server module 5 may change or update an encryption key of the Bluetooth connection between the client device 2 and at least one of the peripheral units 11-14;

/5/ the Bluetooth server module 5 may prevent the client device 2 from obtaining or changing security data of the Bluetooth communication mode used within the piconet 10, and/or used between the client device 2 and one or several of the peripheral units 11-14; and /6/ the Bluetooth server module 5 may provide a secured communication mode between the host device 1 and the client device 2 for the Wi-Fi-transmitted packets which transport a content of Bluetooth packets flowing between the client device 1 and one or several of the peripheral units 11-14.

Although these functions have been recited for Wi-Fi connection between the host device 1 and the client device 2, and for Bluetooth communication between the host device 1 and the peripheral unit 14, they may be combined with any communication mode between devices 1 and 2, and any wireless communication mode between the host device 1 and the peripheral unit 14, and also any level for the server transport module 3 and the client transport module 4 within the protocol stack of the first communication mode.

Possibly, some of these security functions /1/ to /6/ may be implemented on the client device side, by the client application module 6 and/or the transport client module 4.

Changes may be introduced when implementing the invention, with respect to the above description. As a general rule, the communication mode between the host device 1 and the client device 2 may use any transmission medium known. This communication mode between the host device 1 and the client device 2 may also be other than IP protocol. In particular, it may be Bluetooth protocol again, then leading to tunneling of a first Bluetooth connection over a second Bluetooth connection.

The invention claimed is:

1. A method for enabling communication between a client device and a peripheral unit, the peripheral unit being arranged for communicating with a host device using packets of a first type transmitted between the peripheral unit and the host device according to a first communication mode, the first communication mode being a Bluetooth communication mode and the packet of the first type being Bluetooth packets, the host device being further arranged for communicating with the client device using packets of a second type transmitted between the host device and the client device according to a second communication mode, the method comprising:

directing, by a server transport module of the host device, first packets of the first type received from the peripheral unit to a process chain internal to the host device configured for arranging the first packets of the first type within corresponding first packets of the second type;

transmitting the first packets of the second type to the client device;

recovering, by the server transport module, second packets of the first type intended to the peripheral unit and contained in corresponding second packets of the second type received from the client device;

directing the second packets of the first type for transmission by the host device to the peripheral unit;

directing, by a client transport module of the client device, the second packets of the first type intended to the peripheral unit, to a process chain internal to the client device configured for arranging the second packets of the first type within the corresponding second packets of the second type;

transmitting the second packets of the second type by the client device to the host device;

recovering, by the client transport module, the first packets of the first type contained in the corresponding first packets of the second type received from the host device, wherein a communication interface is formed at transport level between the client transport module in the client device and the server transport module in the host device, for communication between the client device and the peripheral unit;

wherein the host device is further provided with a server application module at application level, for controlling an operation of the server transport module at the transport level within the host device; and the client device is further provided with a client application module at an application level, for managing the peripheral unit, and for producing instructions based on application instructions output by an application run by the client device, and the second packets of the first type being based on the instructions, and the client application module controlling an operation of the client transport module at a transport level within the client device;

the method further comprising in the host at an application level, controlling an operation at the transport level within the host device at Host Controller Interface (HCI) level within a Bluetooth protocol stack; and providing at least one additional function relating to communication security when handling the packets, the at least one additional function comprises supporting a restricted subset of commands available to the client device so as to limit the subset of commands available to the client device, and handling but not executing commands which do not pertain to the subset but are produced by the client device.

2. The method according to claim 1, wherein the server application module is exposing the peripheral unit to the client device.

3. The method according to claim 1, wherein the packets of the second type are Internet Protocol (IP) packets.

4. The method according to claim 3, wherein the host device and the client device are adapted to transmit the Internet Protocol packets by Wi-Fi transmission.

5. The method according to claim 1, wherein the host device is configured for disabling discovery of some peripheral units by the client device using the server transport module.

6. The method according to claim 1, wherein the host device is adapted for preventing the client device from obtaining security data of the first communication mode used by the host device and the peripheral unit.

7. A host device adapted for communicating with a peripheral unit using packets of a first type transmitted between the peripheral unit and the host device according to a first communication mode, the first communication mode being a Bluetooth communication mode and the packets of the first type being Bluetooth packets, the host device being further adapted for communicating with a client device using packets of a second type transmitted between the host device and the client device according to a second communication mode, the host device comprising:
  a transmitter;
  a receiver;
  a processor circuit to the transmitter and receiver, the processor circuit configured to:
  first packets of the first type received from the peripheral unit to a process chain internal to the host device configured for arranging the first packets of the first type within corresponding first packets of the second type,
  cause transmission of the first packets of the second type to the client device,
  recover second packets of the first type intended to the peripheral unit and contained in corresponding second packets of the second type received from the client device,
  direct the second packets of the first type for transmission by the host device to the peripheral unit; and
  a server application module at an application level, configured to control an operation of the processor circuit at a transport level within the host device, the processor circuit being at Host Controller Interface (HCI) level within a Bluetooth protocol stack; and
  provide at least one additional function relating to communication security when handling the packets, the at least one additional function comprises supporting a restricted subset of commands available to the client device so as to limit the subset of commands available to the client device, and handling but not executing commands which do not pertain to the subset but are produced by the client device.

8. The host device of claim 7, wherein the server application module is exposing the peripheral unit to the client device.

9. The host device of claim 7, wherein the packets of the second type are Internet Protocol (IP) packets.

10. The host device of claim 9, wherein the host device is adapted to transmit the Internet Protocol packets by Wi-Fi transmission.

11. The host device of claim 7, wherein the host device is configured for disabling discovery of some peripheral units by the client device using the server transport module.

12. The host device of claim 7, wherein the host device is adapted for preventing the client device from obtaining security data of the first communication mode used by the host device and the peripheral unit.

13. A client device adapted for communicating with a host device using packets of a second type transmitted between the client device and the host device according to a second communication mode, the client device comprising:
  a transmitter;
  a receiver;
  a processor circuit coupled to the transmitter and receiver;
  an application for outputting application instructions when the application is run by the client device;
  a client application module at an application level, configured to produce instructions based on the application instructions, the instructions being intended to a peripheral unit adapted for communicating with the host device via a first communication mode, the first communication mode being a Bluetooth communication mode; and control an operation of the processor circuit at a transport level within the client device; and
  the processor circuit configured to:
  direct the second packets of a first type, the packets of the first type being Bluetooth packets, whose content is based on the instructions, to a process chain internal to the client device configured to arrange the second packets of the first type within corresponding second packets of the second type;
  cause transmission of the second packets of the second type by the client device to the host device; and
  recover first packets of the first type produced by the peripheral unit and contained in corresponding first packets of the second type received from the host device;
  wherein the host device is configured to provide at least one additional function relating to communication security when handling the packets, the at least one additional function comprises supporting a restricted subset of commands available to the client device so as to limit the subset of commands available to the client device, and handling but not executing commands which do not pertain to the subset but are produced by the client device.

14. The client device of claim 13, wherein the packets of the second type are Internet Protocol (IP) packets.

15. The client device of claim 13, wherein the packets of the second type are Internet Protocol (IP) packets.

16. The host device of claim 15, wherein the client device is adapted to transmit the Internet Protocol packets by Wi-Fi transmission.

17. A non-transitory computer-readable medium having one or more executable instructions stored thereon, which when executed by a processor cause the processor to perform a method for enabling communication between a client device and a peripheral unit, the peripheral unit being arranged for communicating with a host device using packets of a first type transmitted between the peripheral unit and the host device according to a first communication mode, the first communication mode being a Bluetooth communication mode and the packet of the first type being Bluetooth packets, the host device being further arranged for communicating with the client device using packets of a second type transmitted between the host device and the client device according to a second communication mode, the method comprising:
  directing, by a server transport module of the host device, first packets of the first type received from the peripheral unit to a process chain internal to the host device configured for arranging the first packets of the first type within corresponding first packets of the second type;
  transmitting the first packets of the second type to the client device;
  recovering, by the server transport module, second packets of the first type intended to the peripheral unit and contained in corresponding second packets of the second type received from the client device; and
  directing the second packets of the first type for transmission by the host device to the peripheral unit;

wherein a communication interface is formed, at a transport level between a client transport module in the client device and the server transport module in the host device, for communication between the client device and the peripheral unit the method further comprising in the host at an application level, controlling an operation at the transport level within the host device at Host Controller Interface (HCI) level within a Bluetooth protocol stack; and providing at least one additional function relating to communication security when handling the packets, the at least one additional function comprises supporting a restricted subset of commands available to the client device so as to limit the subset of commands available to the client device, and handling but not executing commands which do not pertain to the subset but are produced by the client device.

18. A non-transitory computer-readable medium having one or more executable instructions stored thereon, which when executed by a processor cause the processor to perform a method for enabling communication between a client device and a peripheral unit, the peripheral unit being arranged for communicating with a host device using packets of a first type transmitted between the peripheral unit and the host device according to a first communication mode, the first communication mode being a Bluetooth communication mode and the packet of the first type being Bluetooth packets, the host device being further arranged for communicating with the client device using packets of a second type transmitted between the host device and the client device according to a second communication mode, the method comprising:

directing, by a client transport module of the client device, second packets of the first type intended to the peripheral unit, to a process chain internal to the client device configured for arranging the second packets of the first type within corresponding second packets of the second type;

transmitting the second packets of the second type by the client device to the host device;

recovering, by the client transport module, first packets of the first type contained in corresponding first packets of the second type received from the host device, wherein communication interface is formed, at a transport level between the client transport module in the client device and a server transport module in the host device, for communication between the client device and the peripheral unit;

wherein the host device is configured to provide at least one additional function relating to communication security when handling the packets, the at least one additional function comprises supporting a restricted subset of commands available to the client device so as to limit the subset of commands available to the client device, and handling but not executing commands which do not pertain to the subset but are produced by the client device.

* * * * *